United States Patent
Autenzeller et al.

(10) Patent No.: US 11,165,210 B2
(45) Date of Patent: Nov. 2, 2021

(54) SLIP RING AND SLIP RING UNIT HAVING A SLIP RING

(71) Applicant: LTN Servotechnik GmbH, Otterfing (DE)

(72) Inventors: Peter Autenzeller, Feldkirchen-Westerham (DE); Andreas Strempel, Bad Aibling (DE)

(73) Assignee: LTN Servotechnik GmbH, Otterfing (DE)

( * ) Notice: Subject to any disclaimer, the term of this patent is extended or adjusted under 35 U.S.C. 154(b) by 1 day.

(21) Appl. No.: 16/831,176

(22) Filed: Mar. 26, 2020

(65) Prior Publication Data

US 2020/0313377 A1    Oct. 1, 2020

(30) Foreign Application Priority Data

Mar. 26, 2019 (EP) ..................... 19165079

(51) Int. Cl.
*H01R 39/08* (2006.01)
*H01R 39/24* (2006.01)
*H01R 39/34* (2006.01)

(52) U.S. Cl.
CPC .............. *H01R 39/08* (2013.01); *H01R 39/24* (2013.01); *H01R 39/34* (2013.01)

(58) Field of Classification Search
CPC ...... H01R 39/08; H01R 39/085; H01R 39/10; H01R 39/12; H01R 39/34; H01R 43/10; H01R 39/24
USPC ....................................................... 310/232
See application file for complete search history.

(56) References Cited

U.S. PATENT DOCUMENTS

| | | | | | |
|---|---|---|---|---|---|
| 2,473,526 | A | * | 6/1949 | Hood | H01R 39/00 439/26 |
| 3,014,193 | A | * | 12/1961 | Schiller | H01R 39/08 439/24 |
| 3,564,168 | A | * | 2/1971 | Bigg | H01R 39/00 200/8 R |
| 6,281,610 | B1 | * | 8/2001 | Kliman | H02K 13/00 310/143 |

(Continued)

FOREIGN PATENT DOCUMENTS

| | | |
|---|---|---|
| EP | 3118946 B1 | 9/2017 |
| JP | S57145550 * | 9/1982 |
| WO | 2019/039084 A1 | 2/2019 |

*Primary Examiner* — Ahmed Elnakib
(74) *Attorney, Agent, or Firm* — Carter Deluca & Farrell LLP

(57) ABSTRACT

A slip ring includes a first dielectric carrier body and a second dielectric carrier body, each carrier body having at least one shoulder extending circumferentially along a circle line. In addition, the slip ring includes conductor elements, which have an annular and closed configuration with respect to an axis, at least one conductor element, which is fixed in place on the shoulder of the first dielectric carrier body, and at least one conductor element, which is fixed in place on the shoulder of the second dielectric carrier body. The first dielectric carrier body is arranged at an offset from the second dielectric carrier body in the direction of the axis, so that the shoulder having the at least one conductor element of the first dielectric carrier body and the shoulder having the at least one conductor element of the second dielectric carrier body are located axially across from each other.

12 Claims, 3 Drawing Sheets

(56) References Cited

U.S. PATENT DOCUMENTS

| | | |
|---|---|---|
| 9,806,482 B2 | 10/2017 | Angerpointner et al. |
| 2007/0167032 A1* | 7/2007 | Angerpointner ....... H01R 39/24 439/22 |
| 2009/0091208 A1 | 4/2009 | Yu et al. |
| 2017/0018900 A1 | 1/2017 | Angerpointner et al. |
| 2017/0194883 A1* | 7/2017 | Sun ..................... G05D 1/0094 |

* cited by examiner

SLIP RING AND SLIP RING UNIT HAVING A SLIP RING

CROSS-REFERENCE TO RELATED APPLICATIONS

The present application claims priority to Application No. 19165079.5, filed in the European Patent Office on Mar. 26, 2019, which is expressly incorporated herein in its entirety by reference thereto.

FIELD OF THE INVENTION

The present invention relates to a slip ring and to a slip ring unit that includes a slip ring.

BACKGROUND INFORMATION

A slip ring unit usually has two component groups, i.e., a stator and a rotor. The stator frequently includes at least one brush unit while the rotor often has a series of slip rings. While in operation, the brushes of the brush units are in sliding contact with the shell sides of the rotating slip rings. Such slip ring units are used in many technical fields for the transmission of electrical signals or electric power from a stationary to a rotating electrical unit or in the reverse direction.

European Patent No. 3 118 946, and U.S. Pat. No. 9,806,482, describe a slip ring, which has a cylindrical carrier body made from an insulating material on which conductor wires that can be allocated to a plurality of tracks are fixed in place.

SUMMARY

Example embodiments of the present invention provide a slip ring or a slip ring unit which is particularly suitable for the transmission of high-frequency currents and/or signals and is simultaneously easy and economical in its production.

According to an example embodiment of the present invention, a slip ring includes a first dielectric (or electrically insulating) carrier body and a second dielectric carrier body. Both carrier bodies have at least one shoulder or a corresponding step extending circumferentially along a circle line. In addition, the slip ring includes a plurality of conductor elements, which are arranged in annular and closed form with respect to an axis, and at least one conductor element is fixed in place on the shoulder of the first dielectric carrier body. Moreover, at least one conductor element is fixed in place on the shoulder of the second dielectric carrier body. The first dielectric carrier body is situated at an offset from the second dielectric carrier body in the direction of the axis, so that the shoulder having the conductor element of the first dielectric carrier body and the shoulder having the conductor element of the second dielectric carrier body are situated axially across from each other.

The conductor elements are arranged in a centered manner with respect to the axis, which therefore means that the conductor elements are concentrically disposed at an axial distance from one another. The conductor elements extend in parallel at an axial offset on the shoulder in the circumferential direction.

Hereinafter, a shoulder of a carrier body, for instance, may correspond to shoulders on bearing rings, in particular in accordance with DIN 615 (magneto ball bearings). Thus, a shoulder may also be understood as a step, in which case the shoulder need not have an uninterrupted, circumferential configuration but may also include interruptions along its circumference.

The at least one conductor element of the first carrier body and the at least one conductor element of the second carrier body may be electrically connected to each other or short-circuited. These conductor elements thus have the same electrical potential.

Two conductor elements may be arranged on the first and the second carrier bodies in each case. These two conductor elements of a carrier body are likewise configured in an annular and closed form with respect to the axis. Two conductor elements are fixed in place on the shoulder of the first dielectric carrier body and two further conductor elements are fixed in place on the shoulder of the second dielectric carrier body. The shoulder having the two conductor elements of the first dielectric carrier body and the shoulder having the two conductor elements of the second dielectric carrier body are situated axially across from each other.

The two conductor elements on the shoulder of the first dielectric carrier body may have different diameters. Alternatively or additionally, the two conductor elements on the shoulder of the second dielectric carrier body may have different diameters. In this context, a diameter refers to, for example, the ring diameter or the outer diameter of the annular and closed conductor elements and not the difference between the inner and outer diameters of the conductor elements (or in other words, not the material thickness of the conductor elements).

The two conductor elements that have a smaller diameter may be arranged at a smaller distance from each other in the axial direction, and the two conductor elements that have a larger diameter may be situated at a greater distance in the axial direction.

Four conductor elements, which have an annular, closed configuration, may be arranged on at least one of the carrier bodies. The four conductor elements are situated in a centered manner with respect to the axis so that conductor elements are disposed in a concentric manner at an axial clearance from one another. For example, the conductor elements may be situated so that a web that is allocated to the carrier body is situated axially between a pair of conductor elements.

The conductor elements may be produced from a semi-finished product, in particular wire, the ends of the wire being welded together so as to abut each other. The wire may have a round or circular cross-section, which may provide advantages in particular for a transmission of high-frequency signals. As a result, the conductor elements, provided they have been produced from a wire having a circular cross-section, have a substantially toroidal geometry.

The semi-finished product may have a cross-section of less than 10 mm$^2$, especially of less than 5 mm$^2$, and most especially of less than 1 mm$^2$.

A terminal lead oriented in the radially inward direction may be formed on at least one conductor element using a T-joint, e.g., with the aid of a welded connection. This may be advantageous if the dielectric carrier body has radially oriented through-feeds for the terminal lead.

The conductor elements may be made from a solid, electrically conductive material. A metal, in particular a precious metal, may be used as an electrically conductive material. Particularly suitable for this purpose are solid silver or solid gold or alloys thereof. For example, the conductor elements are able to be produced from a material that has a mass percentage of silver of at least 80%. As an alternative, the conductor elements may have a surface layer that contains precious metal.

The carrier bodies may have a substantially annular configuration.

The electrically interconnected conductor elements may be allocated to a track which is axially restricted by webs, the webs being allocated to the carrier bodies.

According to an example embodiment of the present invention, a slip ring unit includes a slip ring and a brush unit, having at least one brush, the brush touching the two conductor elements of the first dielectric carrier body at two first points and touching the two conductor elements of the second dielectric carrier body at two second points. The two first points or the two second points or both the first two points and the two second points are situated at an axial offset from one another. The brush may be arranged as a monolithic body, e.g., as a (coated) wire or arranged as a fiber brush or multi-wire design in which a plurality of wires, which are able to move relative to one another, form a brush.

The two first points and/or the two second points of the slip ring unit may be arranged at a radial offset from one another.

The two first points and the two second points of the slip ring unit may be arranged at a radial offset from one another, the particular points that are situated radially farther inside may be disposed at a first axial distance from one another, and the particular points that are situated radially farther outside may be disposed at a second axial distance from one another. The first axial distance is smaller than the second axial distance.

The brush of the slip ring unit may have a circular cross-section. In addition, the brush may be produced from a metal-containing material, in particular a material that does not contain carbon.

The brush may have a surface that contains precious metal such as a surface containing gold.

The slip ring unit may be configured such that a conductor element is able to be contacted twice by the brush. In this context, the brush may have two free ends, each resting against one and the same conductor element at an offset in the circumferential direction. This system may also be denoted as a double brush, which particularly provides redundancy of the current or data transmission.

The conductor elements forming a track may be axially surrounded in the first section by webs that have a larger outer diameter than the conductor elements in order to restrict the axial mobility of the brush.

The slip ring unit is able to be used for the transmission of electric power and/or electrical signals, or in other words, for the transmission of information. The slip ring or the slip ring unit allows for the transmission of high-frequency signals in a relatively uncomplicated manner. The arrangement of the slip ring is particularly advantageous with regard to a reduced electrical capacity.

Further features and aspects of example embodiments of the present invention are described in more detail below with reference to the appended Figures.

DETAILED DESCRIPTION

Figure 1:
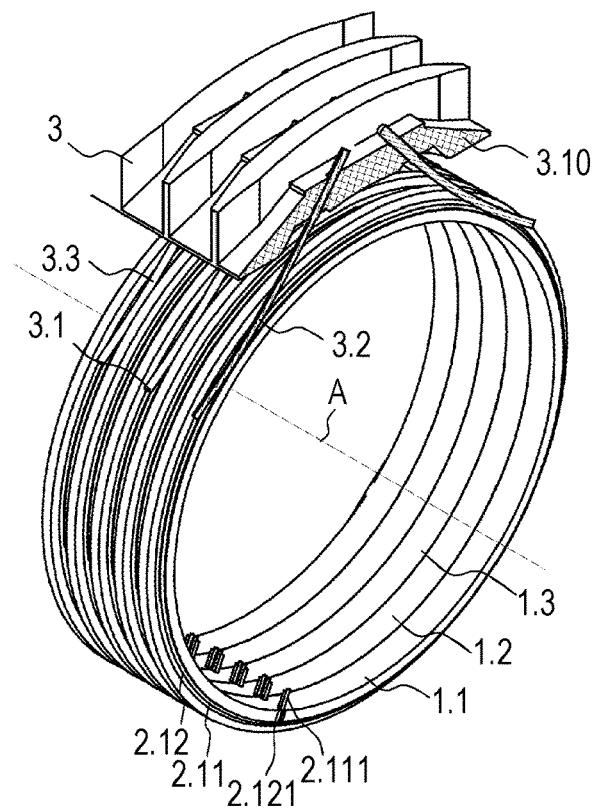
FIG. 1 is a perspective view of a slip ring unit.

FIG. 1 illustrates a slip ring unit, which has a plurality of dielectric and substantially annular carrier bodies 1.1, 1.2, 1.3 on which conductor elements 2.11, 2.12, 2.13, 2.14, 2.21, 2.22, 2.23, 2.24, 2.31, 2.32 are fixed in place (for the sake of clarity, not all conductor elements in FIG. 1 are provided with reference numerals). In addition, the slip ring unit includes a brush unit 3, which has a plurality of brushes 3.1, 3.2, 3.3 that are fixed in place on a brush holder 3.10. Cables may be arranged in the cavity located inside and formed by carrier bodies 1.1, 1.2, 1.3 and may be connected to the brush unit 3.

Figure 2:
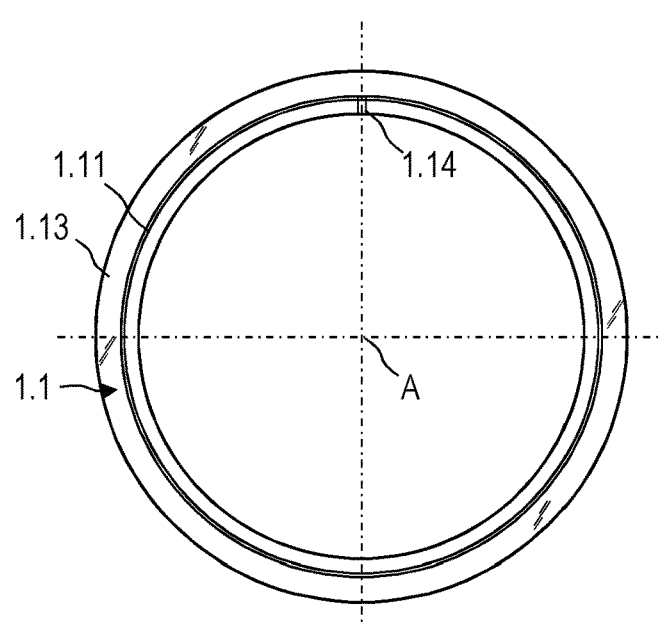
FIG. 2 is a side view of a carrier body.
Figure 4:
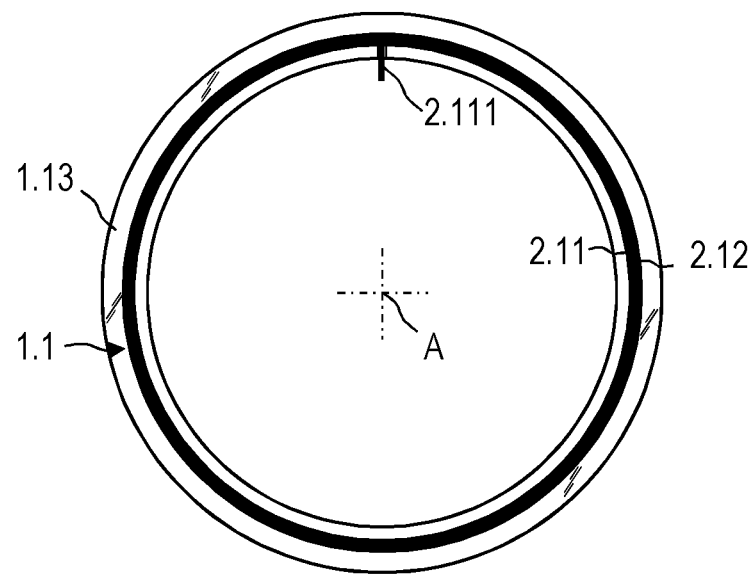
FIG. 4 is a side view of the carrier body including a mounted first conductor element and a mounted second conductor element.
Figure 5:
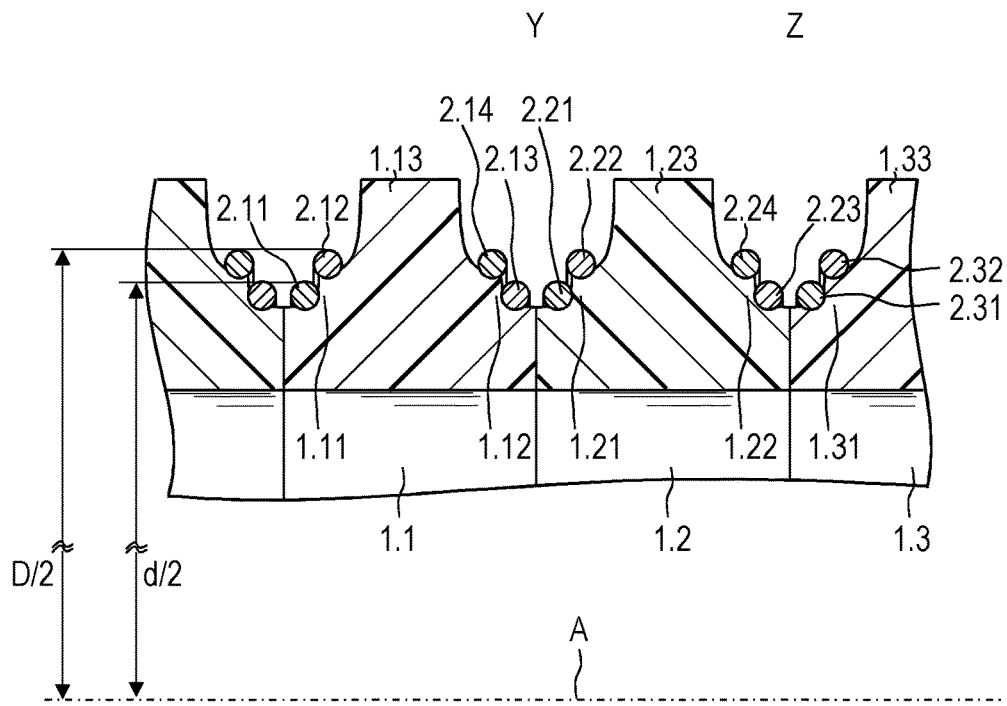
FIG. 5 is a partial longitudinal cross-sectional view through the carrier bodies including the conductor elements.

Carrier bodies 1.1, 1.2, 1.3, as illustrated in FIG. 2 or 4, for instance, are made from plastic and may be produced with the aid of a lathing process or an injection molding process. As illustrated in FIG. 5, each carrier body 1.1, 1.2, 1.3 has a first shoulder 1.11, 1.21, 1.31 and a respective second shoulder 1.12, 1.22, 1.32. Carrier bodies 1.1, 1.2, 1.3 have a web 1.13, 1.23, 1.33 between each first shoulder 1.11, 1.21, 1.31 and each second shoulder 1.12, 1.22, 1.32. Both the first shoulders 1.11, 1.21, 1.31 and the second shoulders 1.12, 1.22, 1.32 have circumferential bearing faces, which are concave, for example. In addition, each carrier body 1.1, 1.2, 1.3 has a through-feed 1.14, which extends radially inward or as a radially extending channel.

Figure 3A:
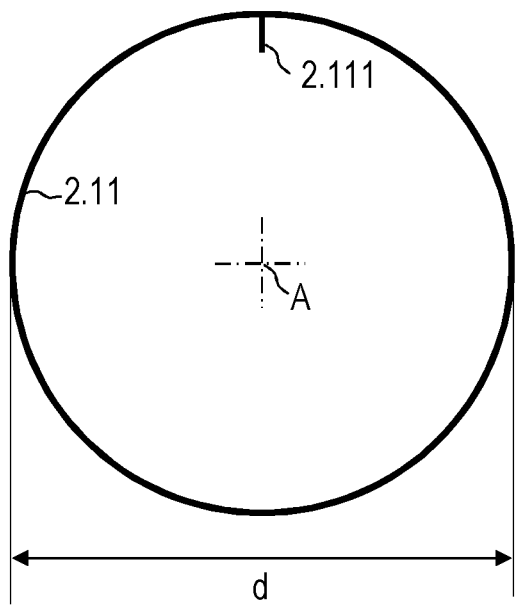
FIG. 3a is a side view of a first conductor element.
Figure 3B:
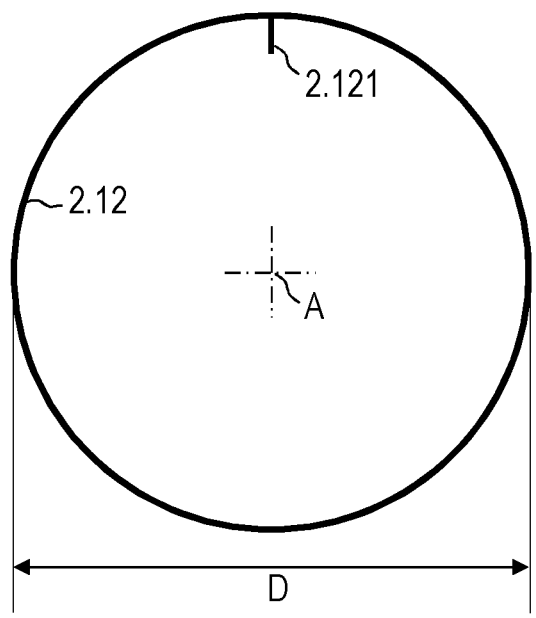
FIG. 3b is a side view of a second conductor element.

To produce conductor elements 2.11, 2.12, 2.13, 2.14, 2.21, 2.22, 2.23, 2.24, 2.31, 2.32, a solid wire, which is made of silver and has a circular cross-section, is utilized as the starting material. This wire, which is able to be made available in the form of a coiled semi-finished product, is cut to length so that pieces having a first length and pieces having a second length are obtained. These pieces of the wire are bent and welded together at the ends so as to abut or are joined using a butt weld, such as with the aid of a laser, so that first rings having a smaller diameter d and second rings having a larger diameter D are produced. Next, relatively short pieces are cut off from the semi-finished wire, which are welded to the rings and later used as terminal leads 2.111, 2.121. In this manner, conductor elements 2.11, 2.12, 2.13, 2.14, 2.21, 2.22, 2.23, 2.24, 2.31, 2.32 are produced of which two (conductor elements 2.11, 2.12) are illustrated in FIG. 3, for example. Terminal leads 2.111, 2.121, which are welded to the ring using a T-butt in each case, extend radially inward. All conductor elements 2.11, 2.12, 2.13, 2.14, 2.21, 2.22, 2.23, 2.24, 2.31, 2.32 are produced in the manner described above, conductor elements 2.11, 2.13, 2.21, 2.23, 2.31 having a smaller diameter d than conductor elements 2.12, 2.14, 2.22, 2.24, 2.32 having the larger diameter D.

In the course of the further assembly of the slip ring unit, conductor elements 2.12, 2.14, 2.22, 2.24, 2.32 having larger diameter D are first fixed in place on the large-diameter circumferential concave bearing faces of carrier bodies 1.1, 1.2, 1.3. Next, conductor elements 2.11, 2.13, 2.21, 2.23 having the smaller diameter d are fixed in place in the same manner on the circumferential concave bearing faces provided for this purpose. The bearing faces or shoulders 1.11, 1.21, 1.31 and conductor elements 2.11, 2.12, 2.13, 2.14,

2.21, 2.22, 2.23, 2.24, 2.31, 2.32 are configured such that conductor elements 2.11, 2.12, 2.13, 2.14, 2.21, 2.22, 2.23, 2.24, 2.31, 2.32 are fastened under mechanical tension to carrier body 1.1, 1.2, 1.3 by clamping. Conductor elements 2.11, 2.12, 2.13, 2.14, 2.21, 2.22, 2.23, 2.24, 2.31, 2.32 are placed on carrier bodies 1.1, 1.2, 1.3 such that terminals 2.111, 2.121 are positioned in through-feeds 1.14.

Carrier bodies 1.1, 1.2, 1.3 including conductor elements 2.11, 2.12, 2.13, 2.14, 2.21, 2.22, 2.23, 2.24, 2.31, 2.32 are placed axially next to one another so that carrier bodies 1.1, 1.2, 1.3 touch one another at their axial end faces. In the next step, cables, whose ends are electrically connected to the terminals 2.111, 2.121, are placed in the internal cavity formed by abutting carrier bodies 1.1, 1.2, 1.3.

Conductor elements 2.13, 2.14, 2.21, 2.22 may be allocated to a first track Y, and conductor elements 2.23, 2.24, 2.31, 2.32 may be allocated to a second track Z (see, e.g., FIG. 5). Web 1.23 separates first track Y with conductor elements 2.13, 2.14, 2.21, 2.22 from an adjacent second track Z. Conductor elements 2.13, 2.14, 2.21, 2.22 of first track Y are electrically connected to one another and thus have the same electrical potential. In the same manner, conductor elements 2.23, 2.24 2.31, 2.32 of second track Z are connected to one another and have the same electrical potential.

Figure 6:
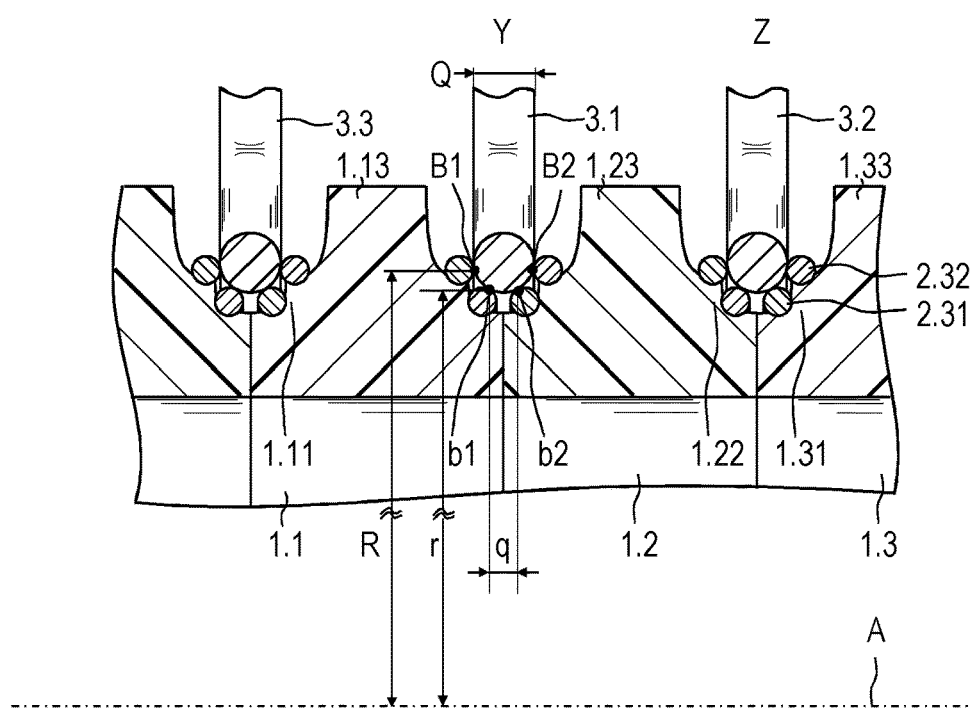
FIG. 6 is a partial longitudinal cross-sectional view through a slip ring unit.

FIG. 6 is a partial longitudinal cross-sectional view of a slip ring unit, which includes carrier bodies 1.1, 1.2, 1.3, conductor elements 2.11, 2.12, 2.13, 2.14, 2.21, 2.22, 2.23, 2.24, 2.31, 2.32, and brushes 3.1, 3.2, 3.3, which are allocated to brush unit 3. Brushes 3.1, 3.2, 3.3 are, for example, arranged as wires, in particular wires having a round or circular cross-section, the wires being, for example, gold plated. First brush 3.1 belongs to first track Y, and second brush 3.2 belongs to second track Z.

Referring to FIG. 6, the geometrical configuration of the slip ring unit is able described using the example of first track Y; second track Z and also all other tracks are configured in a similar manner, for example. Accordingly, brush 3.1 touches each conductor element 2.13, 2.14, 2.21, 2.22 of first track Y (see, e.g., FIG. 5) at at least one point B1, b1, B2, b2 in each case. Brush 3.1 touches the two conductor elements 2.13, 2.14 of first dielectric carrier body 1.1 at two first points b1, B1. In the same manner, brush 3.1 touches the two conductor elements 2.21, 2.22 of second dielectric carrier body 1.2 at two second points b2, B2.

The two first points b1, B1 are located at a radial offset from each other, in which case a point b1 is located at a smaller distance r from axis A, and the other point B1 is located at a greater distance R from axis A. As illustrated in FIG. 6, the radial offset between first points b1, B1 is the difference of the two distances R, r (radial offset=R−r). The same also applies to the two second points b2, B2. In the illustrated exemplary embodiment, points b1, b2, which have a smaller distance r from axis A (being located radially farther inside), and points B1, B2, which have a greater distance R from axis A (being located radially farther outside), are thus present in a track Y, so that r<R applies. Points b1, b2 located radially farther inside incidentally have the same distance r from axis A. In the same manner, points B1, B2 located radially farther outside have the same distance R from axis A.

In addition, points b1, b2 located radially farther inside are disposed at a first axial distance q from each other, and points B1, B2, which are located radially farther outside, are disposed at a second axial distance Q from each other. Here, it holds that first axial distance q is smaller than second axial distance Q (q<Q).

In addition, the two first points b1, B1 are located at an axial offset from each other (axial offset=½·[Q−q]). The same also applies to the two second points b2, B2.

If the two first points b1, B1 are connected by a virtual straight line and the two second points b2, B2 as well, then these straight lines are disposed in the form of a V, the particular V opening radially toward the outside.

The slip ring unit is configured such that during a relative rotation of carrier bodies 1.1, 1.2, 1.3 or of conductor elements 2.11, 2.12, 2.13, 2.14, 2.21, 2.22, 2.23, 2.24, 2.31, 2.32 about an axis A, a current transmission, in particular a signal transmission, is possible between conductor elements 2.11, 2.12, 2.13, 2.14, 2.21, 2.22, 2.23, 2.24, 2.31, 2.32 and brushes 3.1, 3.2, 3.3. Brush unit 3 is frequently allocated to a stator, and conductor elements 2.11, 2.12, 2.13, 2.14, 2.21, 2.22, 2.23, 2.24, 2.31, 2.32 with carrier bodies 1.1, 1.2, 1.3 are allocated to a rotor. The particular placement of conductor elements 2.11, 2.12, 2.13, 2.14, 2.21, 2.22, 2.23, 2.24, 2.31, 2.32 makes it possible that brushes 3.1, 3.2, 3.3 are satisfactorily guided by conductor elements 2.11, 2.12, 2.13, 2.14, 2.21, 2.22, 2.23, 2.24, 2.31, 2.32 and that high-quality, sliding contacting, and thus a reliable signal transmission, is achievable at all times. In addition, webs 1.13, 1.23, 1.33 ensure the greatest maximum restriction of the maximum movement of brushes 3.1, 3.2, 3.3 in the axial direction.

A conductor element 2.11, 2.12, 2.13, 2.14, 2.21, 2.22, 2.23, 2.24, 2.31, 2.32 may be contacted twice by a brush (double-brush design). The ends are able to move radially within the scope of the elasticity of the brushes 3.1, 3.2, 3.3.

The slip ring unit is particularly suitable for the transmission of high-frequency signals. The configuration of the slip ring is considered advantageous in particular in view of a reduced electrical capacity.

What is claimed is:

1. A slip ring, comprising:
    a first dielectric carrier body and a second dielectric carrier body, each carrier body having at least one shoulder extending circumferentially along a circular line; and
    conductor elements having an annular and closed configuration with respect to an axis, at least one conductor element being fixed in place on the shoulder of the first dielectric carrier body, and at least one conductor element being fixed in place on the shoulder of the second dielectric carrier body;
    wherein the first dielectric carrier body is located at an offset from the second dielectric carrier body in a direction of the axis, so that the shoulder having the at least one conductor element of the first dielectric carrier body and the shoulder having the at least one conductor element of the second dielectric carrier body are located axially across from each other;
    wherein two conductor elements, which have an annular and closed configuration with respect to the axis, are located on each of the first dielectric carrier body and the second dielectric carrier body, two conductor elements being fixed in place on the shoulder of the first dielectric carrier body, and two conductor elements being fixed in place on the shoulder of the second dielectric carrier body;
    wherein the shoulder of the first dielectric carrier body having two conductor elements and the shoulder of the second dielectric carrier body having two conductor elements are located axially across from each other; and
    wherein the two conductor elements on the shoulder of the first dielectric carrier body have different diameters, the two conductor elements on the shoulder of the second dielectric carrier body have different diameters, the two conductor elements that have a smaller diameter are arranged at a smaller distance in the axial direction, and the two conductor elements that have a larger diameter are situated at a greater distance in the axial direction.

2. The slip ring according to claim 1, wherein the conductor element of the first dielectric carrier body and the conductor element of the second dielectric carrier body are electrically connected to each other.

3. The slip ring according to claim 1, wherein four conductor elements having an annular and closed configuration are provided on at least one of the carrier bodies.

4. The slip ring according to claim 1, wherein the conductor elements are produced from a semi-finished product.

5. The slip ring according to claim 4, wherein the semi-finished product includes a wire, ends of the wire being welded together and abut each other.

6. The slip ring according to claim 1, wherein a terminal lead oriented in a radially inward direction is formed on at least one conductor element by a T-joint.

7. The slip ring according to claim 1, wherein the conductor elements are formed of a solid, electrically conductive material.

8. The slip ring according to claim 7, wherein the conductor elements are formed of a material that has a mass percentage of silver of at least 80%.

9. A slip ring unit, comprising:
   a slip ring including:
      a first dielectric carrier body and a second dielectric carrier body, each carrier body having at least one shoulder extending circumferentially along a circular line; and
      conductor elements having an annular and closed configuration with respect to an axis, at least one conductor element being fixed in place on the shoulder of the first dielectric carrier body, and at least one conductor element being fixed in place on the shoulder of the second dielectric carrier body, the first dielectric carrier body being located at an offset from the second dielectric carrier body in a direction of the axis, so that the shoulder having the at least one conductor element of the first dielectric carrier body and the shoulder having the at least one conductor element of the second dielectric carrier body are located axially across from each other, the conductor element of the first dielectric carrier body and the conductor element of the second dielectric carrier body being electrically connected to each other; and
   a brush unit including a brush touching the two conductor elements of the first dielectric carrier body at two first points and touching the two conductor elements of the second dielectric carrier body at two second points, the two first points and/or the two second points being located at an axial offset from one another;
   wherein the two first points and the two second points are located at a radial offset from one another, the points that are located radially farther inside are disposed at a first axial distance from one another, and the points that are located radially farther outside are disposed at a second axial distance from one another, the first axial distance being smaller than the second axial distance.

10. The slip ring unit according to claim 9, wherein the two first points and/or the two second points are located at a radial offset from one another.

11. The slip ring unit according to claim 9, wherein the brush has a circular cross-section.

12. The slip ring unit according to claim 9, wherein the brush is formed of a metal-containing material.

\* \* \* \* \*